(No Model.) 4 Sheets—Sheet 1.

J. W. ROOP.
MACHINE FOR MAKING BARBED FENCE STRIPS.

No. 330,852. Patented Nov. 17, 1885.

WITNESSES: Chas. Nida, C. Sedgwick

INVENTOR: J. W. Roop
BY Munn & Co.
ATTORNEYS.

(No Model.) 4 Sheets—Sheet 2.

J. W. ROOP.
MACHINE FOR MAKING BARBED FENCE STRIPS.

No. 330,852. Patented Nov. 17, 1885.

WITNESSES:
Chas. Nida.
C. Sedgwick.

INVENTOR:
J. W. Roop
BY Munn & Co.
ATTORNEYS.

(No Model.) 4 Sheets—Sheet 3.

J. W. ROOP.
MACHINE FOR MAKING BARBED FENCE STRIPS.

No. 330,852. Patented Nov. 17, 1885.

WITNESSES:
Chas. Nida
C. Sedgwick

INVENTOR:
J. W. Roop
BY Munn & Co.
ATTORNEYS.

(No Model.) 4 Sheets—Sheet 4.

J. W. ROOP.
MACHINE FOR MAKING BARBED FENCE STRIPS.

No. 330,852. Patented Nov. 17, 1885.

WITNESSES:

INVENTOR: J. W. Roop
BY Munn & Co.
ATTORNEYS.

UNITED STATES PATENT OFFICE.

JACOB WARREN ROOP, OF HARRISBURG, PENNSYLVANIA.

MACHINE FOR MAKING BARBED FENCE-STRIPS.

SPECIFICATION forming part of Letters Patent No. 330,852, dated November 17, 1885.

Application filed April 28, 1885. Serial No. 163,770. (No model.)

*To all whom it may concern:*

Be it known that I, JACOB WARREN ROOP, of Harrisburg, in the county of Dauphin and State of Pennsylvania, have invented a new and useful Improvement in Rolls for Making Metallic Barbed Fencing-Strips, of which the following is a full, clear, and exact description.

Reference is to be had to the accompanying drawings, forming a part of this specification, in which similar letters of reference indicate corresponding parts in all the figures.

Figure 1:
Figure 2:
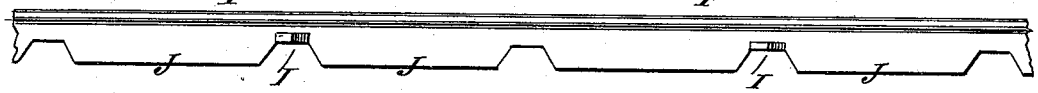
Figure 3:
Figure 4:
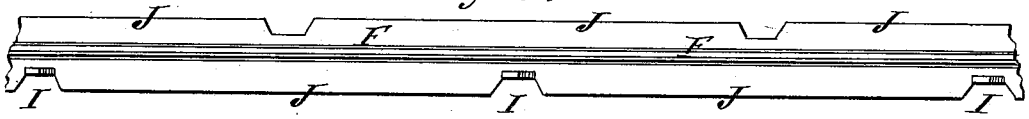
Figure 5:
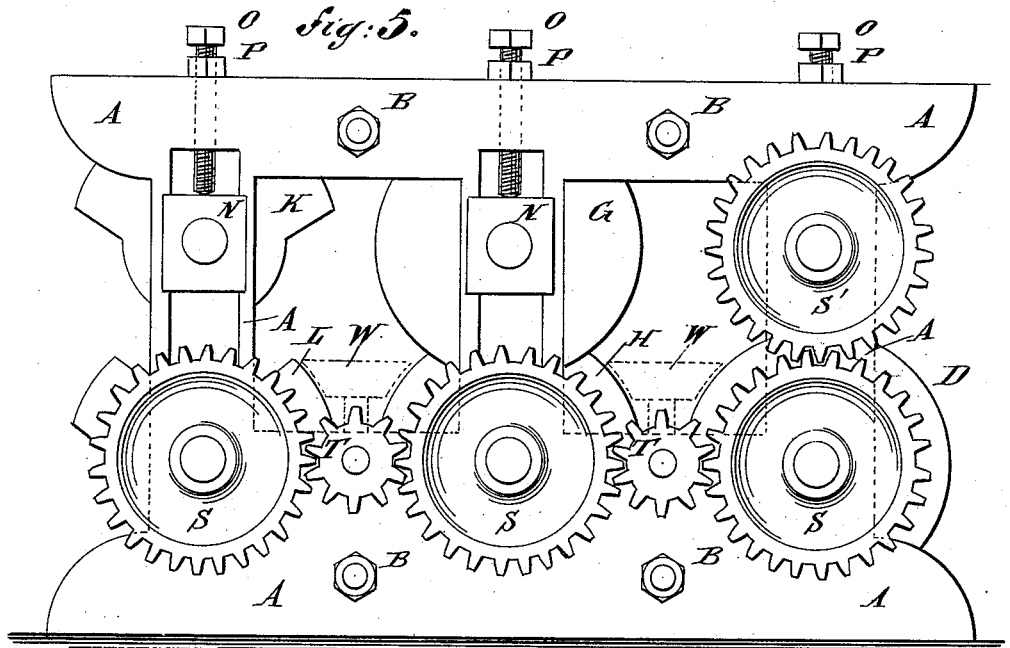
Figure 6:
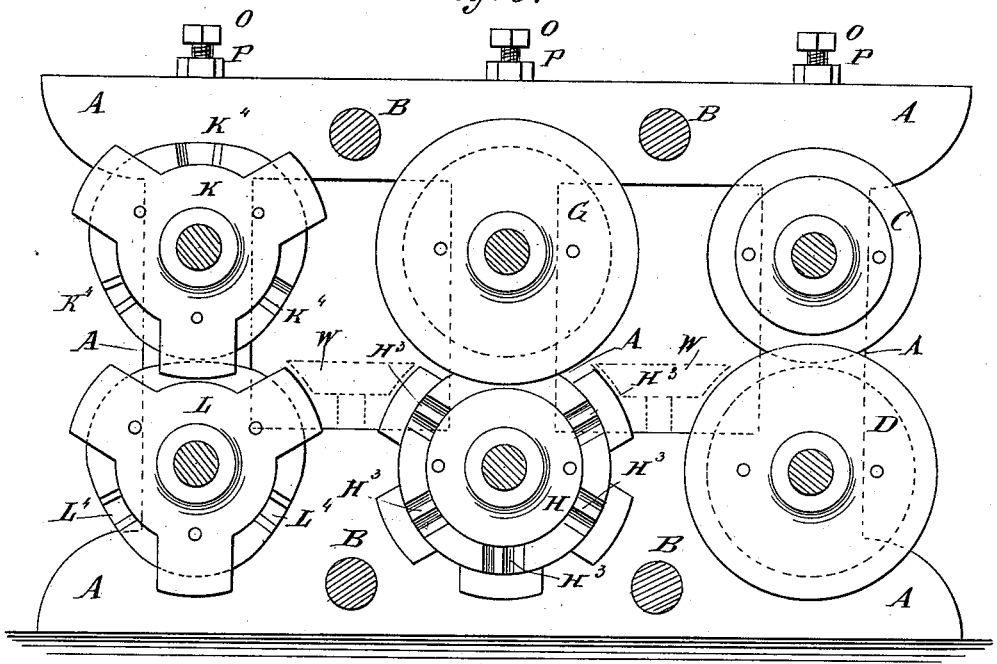
Figure 8:
Figure 9:
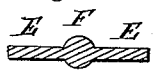
Figure 7:
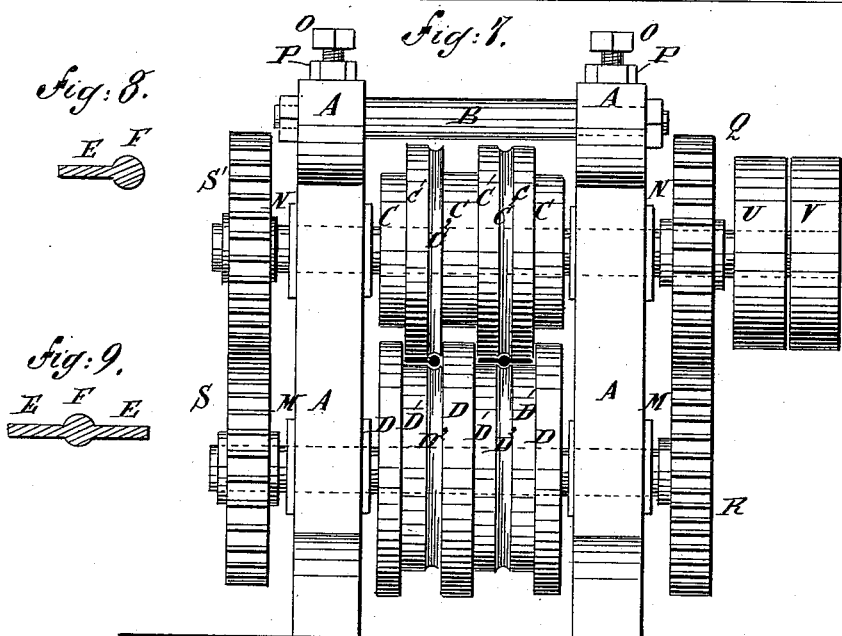
Figure 10:
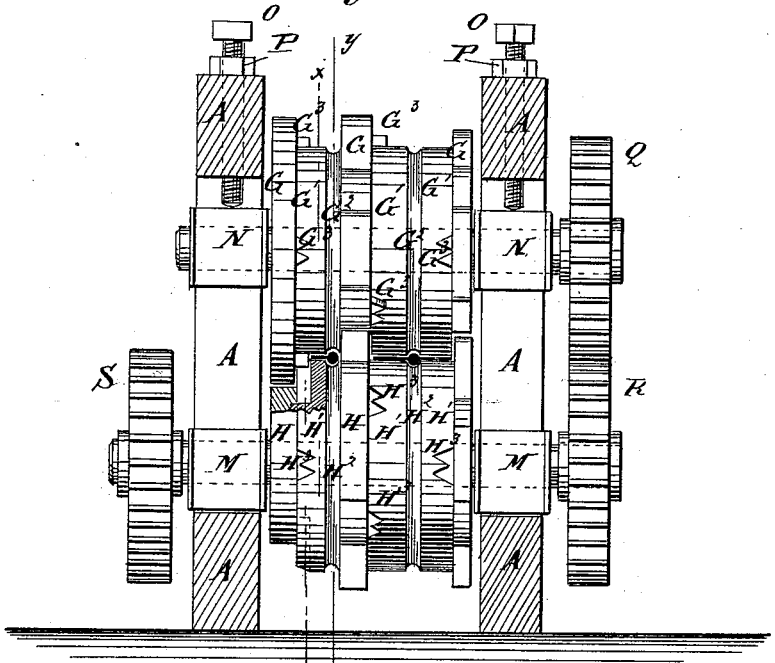
Figure 11:
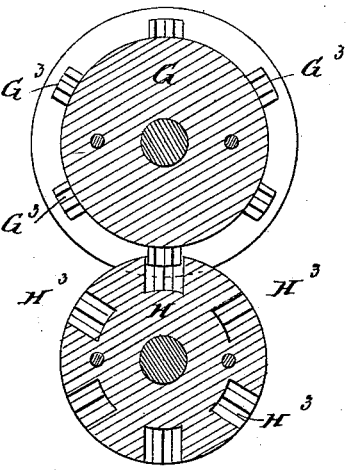
Figure 12:
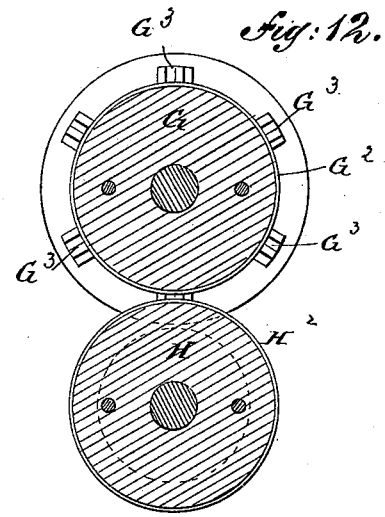
Figure 13:
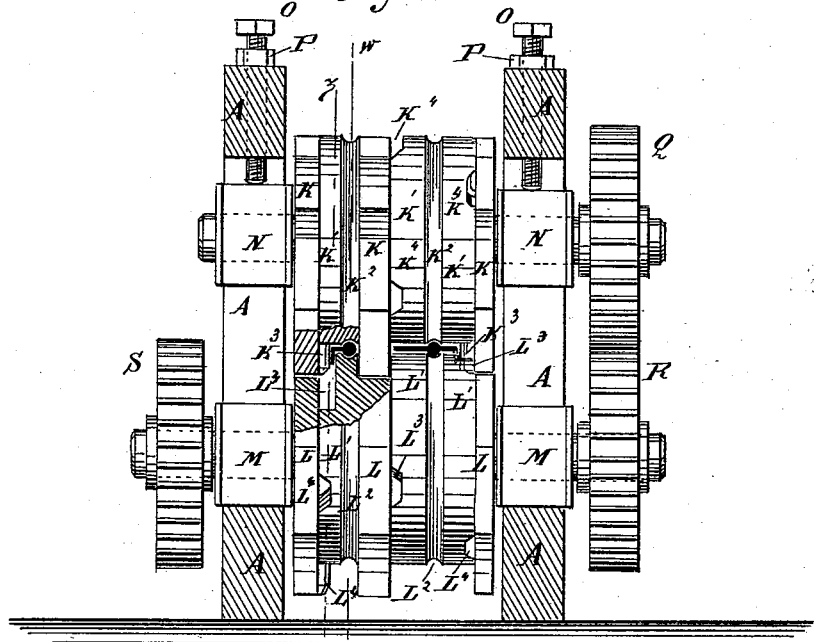
Figure 14:
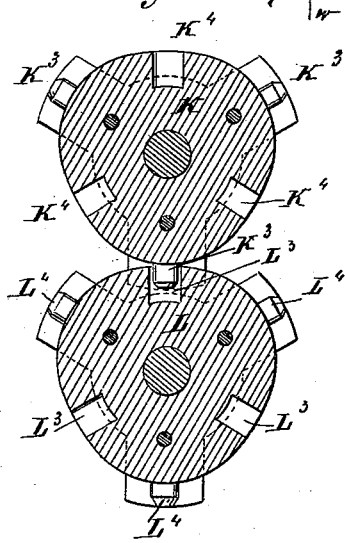
Figure 15:
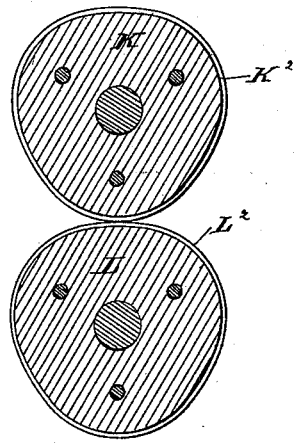

Figure 1, Sheet 1, is an edge view of a portion of a fencing-strip made by my improved rolls. Fig. 2, Sheet 1, is a plan view of the same. Fig. 3, Sheet 1, is an edge view of a portion of a double-winged fencing-strip made by my improved rolls. Fig. 4, Sheet 1, is a plan view of the same. Fig. 5, Sheet 1, is a side elevation of a rolling-machine for making metallic barbed fencing-strips. Fig. 6, Sheet 2, is a sectional side elevation of the same. Fig. 7, Sheet 2, is an end elevation of the same, showing the pair of rolls for forming the blank strips. Fig. 8, Sheet 2, is a sectional end elevation of a single-winged blank strip. Fig. 9, Sheet 2, is a sectional end elevation of a double-winged blank strip. Fig. 10, Sheet 3, is a sectional end elevation of a rolling-machine for making metallic barbed fencing-strips, showing the pair of rolls for cutting out the barbs and ornamental alarm-fins, part being broken away. Fig. 11, Sheet 3, is a sectional end elevation of the pair of rolls shown in Fig. 10, taken through the line $x\ x$. Fig. 12, Sheet 3, is a sectional end elevation of the same, taken through the line $y\ y$, Fig. 10. Fig. 13, Sheet 4, is a sectional end elevation of a rolling-machine for making metallic barbed fencing-strips, showing the pair of rolls for bending up and down alternately the barbs and corrugating the strips, part being broken away. Fig. 14, Sheet 4, is a sectional end elevation of the pair of rolls shown in Fig. 13, taken through the line $z\ z$. Fig. 15, Sheet 4, is a sectional end elevation of the same, taken through the line $w\ w$, Fig. 13.

The object of this invention is to provide rolls for making metallic barbed fencing-strips, the said rolls being so constructed as to form blank strips, cut out the barbs and ornamental alarm-fins, and then bend up and down alternately the barbs and corrugate the strips.

The invention consists in the construction and combination of various parts of the rolls, as will be hereinafter fully described, and then pointed out in the claims.

A are the side frames of the rolling-machine, which are connected and held in proper relative position by tie bolts or rods B. To one end of the frames A are journaled a pair of rolls, C D, which are made with plane portions C' D', and with annular grooves $C^2\ D^2$ at one side of the said plane portions, as shown in the left-hand part of Fig. 7, so as when a bar of iron, steel, or other suitable metal is run through the said rolls it will come out as a flat strip, E, with a bead, F, along one edge or as a single-winged strip, as shown in Fig. 8.

In the modification shown in the right-hand part of Fig. 7, the rolls C D are made with plane partitions C' D', having annular grooves $C^2\ D^2$ in their centers, so as when a bar of steel, iron, or other suitable metal is run through the said rolls it will come out as a flat strip, E, with a bead, F, along its center, or as a double-winged strip, as shown in Fig. 9. From the rolls C D the blank strips E F pass between the rolls G H, journaled to the middle parts of the frames A. The rolls G H are made with plane portions G' H' and annular grooves $G^2\ H^2$, the same as the rolls C D, and have male dies $G^3$ at the outer edges of the plane portions G' of the upper rolls, G, and female dies $H^3$ at the outer edges of the plane portions H' of the lower roll, H, to cut out V or any other shaped pieces of the flat parts of the blank strips E F, forming barbs I and fins J. The dies $G^3\ H^3$ are so formed that the cuts made by them will not reach quite to the beads F, but will leave a narrow web between the inner ends of the said cuts and the said beads F. From the rolls G H the fencing-strips F I J pass to a third pair of rolls, K L, journaled to the other ends of the frames A. The rolls K L are made with plane portions K' L' and annular grooves $K^2\ L^2$, the same as the rolls C D and G H. The rolls K L are provided with alternate male and female dies $K^3\ K^4\ L^3\ L^4$ at the outer edges of the plane portions K' L', to bend the barbs I at right angles with the plane of the strips and alternately in opposite directions, as shown in Figs. 13, 1, 2, 3, and 4. The faces of the rolls K L are curved slightly, as shown in Figs. 14 and 15, to give a very moderate corrugation to the strips F I J, as shown in Figs. 1 and 3. The corrugations of the strips F I J should be sufficient to allow the said strips to contract in cold weather without straining the fastenings that secure the said strips to the fence-posts, and to expand in warm weather without sagging between the posts, and thus giving the fence an unsightly appearance. The curves of the rolls K L and the positions of the dies $K^3 L^3 K^4 L^4$ should be so arranged, as shown in Fig. 14, that the barbs I will project from the convex parts of the strips F I J, as illustrated in Figs. 1 and 3. The journals of the lower rolls, D H L, revolve in bearings M in the lower parts of slotted uprights of the frames A. The journals of the upper rolls, C G K, revolve in bearings N in the upper parts of the said slotted uprights. The bearings N are held down to limit the upward movements of the said upper rolls when operating upon a bar or strip by set-screws O, passing down through the top bars of the frames A, and locked in place when adjusted by jam-nuts P, so that the said upper rolls can be made to roll the fencing-strips to any desired thickness. At one side of the machine the journal of the rolls of each pair are connected by equal-sized gear-wheels Q R, so that the rolls of each pair will move at uniform speed. At the other side of the machine large gear-wheels S are attached to the journals of the lower rolls, D L H, and are connected by small gear-wheels T, interposed between them, as shown in Fig. 5. At this side also a gear-wheel, S', of the same size as the gear-wheels S of the roll D, is attached to the journal of the roll C, so that the rolls C D, that reduce the bar to a blank strip, and thus do the heaviest work, will be connected at both ends.

To one of the journals of the roll C is attached a fast pulley, U, and a loose pulley, V, to receive a driving-belt; or, if desired, the rolls can be driven by gear-wheels connected to the engine-shaft.

In case the pairs of rolls be arranged one in front of the other, as shown in Figs. 5 and 6, so as to form the strips from bars at a continuous operation, guide-aprons W should be interposed between the pairs of rolls, as indicated in dotted lines in Figs. 5 and 6, to guide the strips from one pair of rolls to the next pair.

The rolls are made in parts or sections, secured to each other by bolts, as indicated by the bolts in Figs. 11, 12, 14, 15, so that any part that may become worn or be broken can be removed and replaced by a new section, thus avoiding the necessity of having an entire new roll, and allowing the rolls to be duplicated in whole or in part to any desired extent.

Having thus fully described my invention, I claim as new and desire to secure by Letters Patent—

1. In rolls for making metallic barbed fencing-strips, the rolls G H, made, substantially as herein shown and described, with plane portions G' H', to receive the web E of the fencing-strip blanks, annular grooves $G^2 H^2$, to receive the strengthening-beads F, and male and female dies $G^3 H^3$, to cut pieces from the outer parts of the web E to form barbs I and ornamental alarm-fins J, as set forth.

2. In rolls for making metallic barbed fencing-strips, the rolls K L, made, substantially as herein shown and described, with plane portions K' L', to receive the barbs I and fins J, annular grooves $K^2 L^2$, to receive the strengthening-beads F, and alternating male and female dies $K^3 L^3 L^4 K^4$, to bend the barbs I alternately in opposite directions, as set forth.

3. The combination, with the frame A B, of the pair of rolls C D, having plane portions C' D', and annular grooves $C^2 D^2$, for forming the blank strips, the pair of rolls G H, having plane portions G' H', annular grooves $G^2 H^2$, and male and female dies $G^3 H^3$, for forming the barbs I and ornamental alarm-fins J in the webs of the blank strips, the pair of rolls K L, having plane portions K' L', annular grooves $K^2 L^2$, alternating male and female dies $K^3 L^3 L^4 K^4$, for bending the barbs I in the opposite directions, and curved faces to corrugate the strips, and the connecting and driving gearing Q R S T S', substantially as herein shown and described, whereby the fencing-strips will be formed from a bar of metal by a continuous operation, as set forth.

JACOB WARREN ROOP.

Witnesses:
JOHN X. QUIGLEY,
ROLLA L. SMITH.